United States Patent
Higaki et al.

(10) Patent No.: US 10,246,761 B2
(45) Date of Patent: Apr. 2, 2019

(54) METHOD FOR RECOVERING SCANDIUM

(71) Applicant: SUMITOMO METAL MINING CO., LTD., Tokyo (JP)

(72) Inventors: Tatsuya Higaki, Niihama (JP); Hidemasa Nagai, Niihama (JP); Hiroshi Kobayashi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/061,684

(22) PCT Filed: Dec. 13, 2016

(86) PCT No.: PCT/JP2016/086971
§ 371 (c)(1),
(2) Date: Jun. 13, 2018

(87) PCT Pub. No.: WO2017/104629
PCT Pub. Date: Jun. 22, 2017

(65) Prior Publication Data
US 2018/0371579 A1    Dec. 27, 2018

(30) Foreign Application Priority Data
Dec. 16, 2015 (JP) .................. 2015-244937

(51) Int. Cl.
*C22B 59/00* (2006.01)
*C22B 3/24* (2006.01)
*C22B 3/44* (2006.01)

(52) U.S. Cl.
CPC .......... *C22B 59/00* (2013.01); *C22B 3/24* (2013.01); *C22B 3/44* (2013.01); *Y02P 10/234* (2015.11)

(58) Field of Classification Search
None
See application file for complete search history.

(56) References Cited

U.S. PATENT DOCUMENTS

2014/0373683 A1    12/2014    Boudreault et al.
2015/0284821 A1    10/2015    Takano et al.
2016/0340757 A1    11/2016    Higaki et al.

FOREIGN PATENT DOCUMENTS

JP    03-173725 A    7/1991
JP    09-194211 A    7/1997
(Continued)

OTHER PUBLICATIONS

Notification of Reasons for Rejection dated May 22, 2018, issued to JP application No. 2015-244937 and English translation thereof.
(Continued)

*Primary Examiner* — Melissa S Swain
(74) *Attorney, Agent, or Firm* — Locke Lord LLP

(57) ABSTRACT

A method for recovering scandium is provided, which is capable of recovering highly-pure scandium from nickel oxide ore in a simple and efficient manner. The method for recovering scandium according to the present invention includes a scandium elution step S2 of passing a solution containing scandium through an ion exchange resin to obtain an eluted liquid containing scandium from the ion exchange resin, a neutralization step S3 of adding for neutralization a neutralizing agent to the eluted liquid, a solvent extraction step S4 of solvent-extracting the neutralized eluted liquid using an amine-based extracting agent, and a scandium recovering step S5 of obtaining a scandium precipitate from residual liquid separated by the solvent extraction, and then roasting the precipitate to obtain scandium oxide.

12 Claims, 5 Drawing Sheets

(56) References Cited

FOREIGN PATENT DOCUMENTS

| | | |
|---|---|---|
| JP | 09-291320 A | 11/1997 |
| JP | 2014-513212 A | 5/2014 |
| JP | 2015-040332 A | 3/2015 |
| WO | 2014/110216 A1 | 7/2014 |
| WO | 2014/118288 A1 | 8/2014 |
| WO | 2015/115269 A1 | 8/2015 |
| WO | 2016/084830 A1 | 6/2016 |

OTHER PUBLICATIONS

International Search Report dated Mar. 21, 2017, issued for PCT/JP2016/086971.

METHOD FOR RECOVERING SCANDIUM

TECHNICAL FIELD

The present invention relates to a method for recovering scandium, more specifically, it relates to a method for recovering scandium which easily and efficiently recovers scandium contained in nickel oxide ore by solvent extraction using an amine-based extractant.

BACKGROUND ART

Scandium is extremely useful as an additive for a high strength alloy and an electrode material for a fuel cell. However, scandium has not yet been used widely due to the small production quantity and high cost thereof.

Note that scandium is contained in nickel oxide ore such as laterite ore and limonite ore in a trace amount. However, nickel oxide ore has not been industrially used as a nickel raw material for a long due to the low grade of nickel contained. Hence, it has also been scarcely studied to industrially recover scandium from nickel oxide ore.

However, in recent years, the HPAL process has been emerging as a practical method, in which nickel oxide ore is introduced into a pressure vessel along with sulfuric acid and heated at a high temperature of about 240° C. to 260° C. to separate the mixture into a leachate containing nickel and a leach residue by solid-liquid separation. In this HPAL process, a neutralizing agent is added to the leachate obtained to separate impurities and then a sulfurizing agent is added to the leachate from which impurities have been separated to recover nickel as nickel sulfide. Thereafter, electric nickel or a nickel salt compound can be obtained by treating this nickel sulfide by a known nickel refinement process.

In the case of using the HPAL process as described above, scandium contained in nickel oxide ore is contained in the leachate along with nickel (see Patent Document 1). Thereafter, a neutralizing agent is added to the leachate obtained by the HPAL process to separate impurities and then a sulfurizing agent is added to the resulting leachate to recover nickel as nickel sulfide as well as to contain scandium in the acidic solution after the addition of a sulfurizing agent. Hence, it is possible to effectively separate nickel and scandium from each other by using the HPAL process.

In addition, there is also a method in which scandium is separated using a chelating resin (see Patent Document 2). Specifically, in the method disclosed in Patent Document 2, first, nickel and scandium are selectively leached from nickel-containing oxide ore into an aqueous acidic solution at a high temperature and a high pressure in an oxidizing atmosphere to obtain an acidic solution, subsequently the pH of the acidic solution is adjusted to a range of 2 to 4, and then nickel is selectively precipitated and recovered as a sulfide by use of a sulfurizing agent. Next, scandium is adsorbed to a chelating resin by bringing the solution obtained after nickel recovery into contact with the chelating resin, the chelating resin is washed with a dilute acid, and then scandium is eluted from the chelating resin by bringing the chelating resin after washing into contact with a strong acid.

In addition, as a method for recovering scandium from the acidic solution described above, a method for recovering scandium by solvent extraction has also been proposed (see Patent Documents 3 and 4). Specifically, in the method disclosed in Patent Document 3, first, an organic solvent prepared by diluting 2-ethylhexylsulfonic acid-mono-2-ethylhexyl with kerosene is added to a scandium-containing solution of an aqueous phase containing at least one or more kinds among iron, aluminum, calcium, yttrium, manganese, chromium, and magnesium in addition to scandium and the scandium component is extracted into the organic solvent. Subsequently, in order to separate yttrium, iron, manganese, chromium, magnesium, aluminum, and calcium which have been extracted into the organic solvent along with scandium, an aqueous solution of hydrochloric acid is added to the organic solvent and scrubbing is performed to remove these components, then an aqueous solution of NaOH is added to the organic solvent to obtain a slurry containing $Sc(OH)_3$ converted from scandium remained in the organic solvent, $Sc(OH)_3$ obtained by filtration of this slurry is dissolved with hydrochloric acid to obtain an aqueous solution of scandium chloride. Thereafter, oxalic acid is added to the aqueous solution of scandium chloride thus obtained to precipitate scandium oxalate, the precipitate is filtered to separate iron, manganese, chromium, magnesium, aluminum, and calcium into the filtrate, and then the precipitate filtered is calcined to obtain high purity scandium oxide.

In addition, Patent Document 4 describes a method for selectively separating and recovering scandium from a scandium-containing feed liquid by bringing a scandium-containing feed liquid into contact with an extractant at a fixed proportion by a batch treatment.

As the grade of scandium to be recovered by these methods, it is known to obtain a purity of about 95% to 98% in terms of scandium oxide. This grade is sufficient for applications such as addition to alloys, but a still higher purity, for example, a grade of about 99.9% is required in order to exert favorable properties for applications such as an electrolyte of a fuel cell which is increasingly demanded in recent years.

However, the kind and quantity of nickel oxide ore described above vary depending on the area from which the nickel oxide ore is produced and various impurity elements such as manganese and magnesium are contained in the nickel oxide ore in addition to iron and aluminum.

In the case of using scandium in applications such as an electrolyte of a fuel cell, the grade has an acceptable upper limit depending on the elements of impurities, and it is required to separate and remove the individual elements until the acceptable limit or less.

However, in the chelating resin and the organic solvent which have been disclosed in Patent Document 2 and Patent Document 3, several impurity elements exhibit behavior similar to scandium and it is thus difficult to effectively separate and recover scandium. In addition, the concentration of impurities such as iron and aluminum contained in the leachate of nickel oxide ore is still higher than that of scandium, these impurities in large amounts have also affected the recovery of scandium, and a suitable method for industrially recovering high purity scandium from nickel oxide ore has not been found out.

As described above, it has been difficult to efficiently separate a wide variety of impurities such as iron and aluminum contained in large amounts and to efficiently recover high purity scandium even when it is attempted to recover scandium from nickel oxide ore.

Patent Document 1: Japanese Unexamined Patent Application, Publication No. H03-173725
Patent Document 2: Japanese Unexamined Patent Application, Publication No. H09-194211
Patent Document 3: Japanese Unexamined Patent Application, Publication No. H09-291320
Patent Document 4: PCT International Publication No. WO2014/110216

DISCLOSURE OF THE INVENTION

Problems to be Solved by the Invention

The present invention has been proposed in view of the circumstances as described above, and an object thereof is to provide a method for recovering scandium which can simply and efficiently recover high purity scandium from nickel oxide ore.

Means for Solving the Problems

The present inventors have conducted extensive studies to solve the aforementioned problems. As a result, the present inventors have found out that high purity scandium can be simply and efficiently recovered from nickel oxide ore by adding a neutralizing agent to an acidic solution containing scandium for a neutralization treatment and then subjecting the solution after neutralization to solvent extraction using an amine-based extractant, whereby the present invention has been completed. That is, the present invention provides the following.

(1) A first embodiment of the present invention provides a method for recovering scandium including: a scandium elution step of allowing a solution containing scandium to pass through an ion exchange resin and obtaining an eluate containing scandium from the ion exchange resin; a neutralization step of neutralizing the eluate by adding a neutralizing agent to the eluate; a solvent extraction step of subjecting a post-neutralization eluate to solvent extraction using an amine-based extractant; and a scandium recovering step of obtaining a precipitate of scandium from a raffinate liquid separated by solvent extraction and obtaining scandium oxide by roasting the precipitate.

(2) A second embodiment of the present invention provides the method for recovering scandium according to the first embodiment, in which scrubbing to mix a sulfuric acid solution having a concentration of 1.0 mol/L or more and 3.0 mol/L or less as a washing liquid with an extractant after solvent extraction and to separate scandium contained in the extractant into the washing liquid is performed in the solvent extraction step and a precipitate of scandium is obtained from the washing liquid after scrubbing along with the raffinate liquid in the scandium recovering step.

(3) A third embodiment of the present invention provides the method for recovering scandium according to the first embodiment, in which a carbonate is added to an extractant after solvent extraction and backward extraction is performed to obtain an extractant after backward extraction and a backward extraction liquid in the solvent extraction step.

(4) A fourth embodiment of the present invention provides the method for recovering scandium according to the third embodiment, in which the extractant after backward extraction is repeatedly used as the extractant for solvent extraction.

(5) A fifth embodiment of the present invention provides the method for recovering scandium according to any one of the first to fourth embodiments, in which a neutralizing agent is added to the eluate to adjust a pH to a range of 5 to 6, a neutralized precipitate and a neutralized filtrate are generated by solid-liquid separation, and an acid is added to the neutralized precipitate to obtain a redissolved liquid in the neutralization step and the redissolved liquid obtained is subjected to solvent extraction as the post-neutralization eluate in the solvent extraction step.

(6) A sixth embodiment of the present invention provides the method for recovering scandium according to any one of the first to fourth embodiments, in which a neutralizing agent is added to the eluate to adjust a pH to a range of 3.5 to 4.5, a primary neutralized precipitate and a primary neutralized filtrate are generated by solid-liquid separation, subsequently a neutralizing agent is further added to the primary neutralized filtrate to adjust a pH to a range of 5.5 to 6.5, a secondary neutralized precipitate and a secondary neutralized filtrate are generated by solid-liquid separation, and an acid is added to the secondary neutralized precipitate to obtain a redissolved liquid in the neutralization step and the redissolved liquid obtained is subjected to solvent extraction as the post-neutralization eluate in the solvent extraction step.

Effects of the Invention

According to the present invention, high purity scandium can be simply and efficiently recovered from nickel oxide ore.

PREFERRED MODE FOR CARRYING OUT THE INVENTION

Below, specific embodiments of the present invention (hereinafter referred to as the "present embodiments") will be described in more detail with reference to the drawings. Note that the present invention shall not be limited to these and can be implemented with appropriate modifications made without departing from the spirit of the present invention. Note that the expression "X to Y" (X and Y are arbitrary numerical values) in the present specification means "X or more and Y or less".

<<1. Method for Recovering Scandium>>

Figure 1:
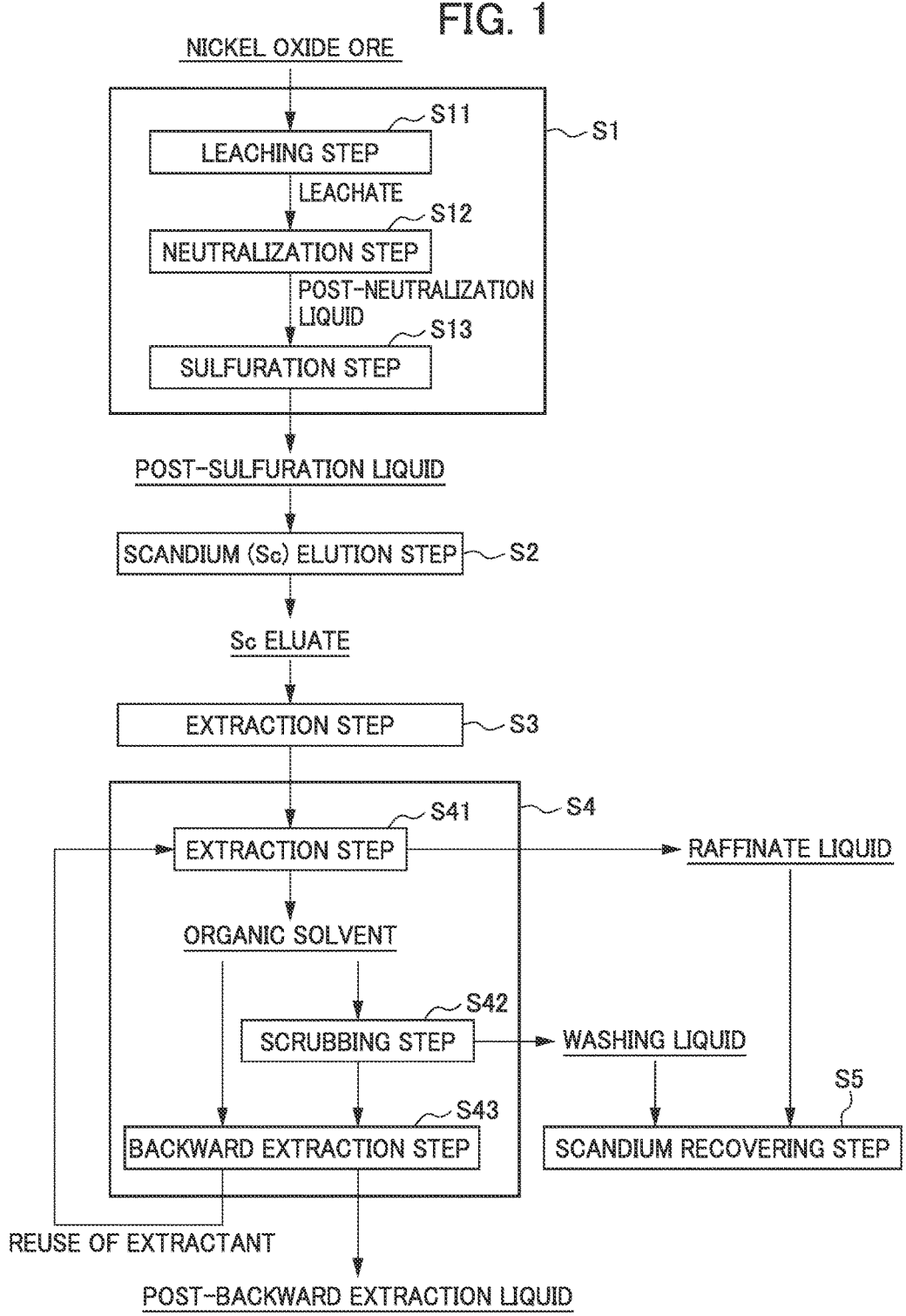
FIG. 1 is a flow diagram for explaining a method for recovering scandium.

FIG. 1 is a flow diagram for illustrating an example of a method for recovering scandium according to the present embodiment. This method for recovering scandium is a method to simply and efficiently recover high purity scandium by separating scandium and impurities from an acidic solution which contains scandium and is obtained by leaching nickel oxide ore with an acid such as sulfuric acid.

In this method for recovering scandium, by subjecting an acidic solution containing scandium to solvent extraction using an amine-based extractant, a part of impurities simultaneously contained in the acidic solution is extracted into the extractant and separated from scandium which remains in the acidic solution after extraction. Scandium which is contained in the raffinate liquid by solvent extraction is converted into a solid shape suitable for the product application by a method in which oxalic acid is added to the raffinate liquid and scandium is recovered as a precipitate, the remaining impurities are also separated, and thus scandium can be recovered as a crystal of high purity scandium oxalate.

The scandium oxalate obtained is converted into the form of scandium oxide by being roasted and the like by known methods. Scandium oxide generated in this way can be used as a material for an electrolyte of a fuel cell or can be used in applications in which scandium metal is further generated from the scandium oxide by a method such as molten salt electrolysis and added to aluminum and the like to obtain an alloy.

In the method for recovering scandium according to the present embodiment, a solvent extraction treatment using an amine-based solvent extractant is performed when scandium is separated and recovered by solvent extraction. According to such a method, it is possible to more effectively separate impurities, to perform a stable operation even from a raw material containing a large number of impurities such as nickel oxide ore, and to efficiently recover high purity scandium.

Moreover, at this time, in the present embodiment, a neutralizing agent is added to a scandium-containing acidic solution to be subjected to solvent extraction, a neutralization treatment is performed, and scandium in the acidic solution is enriched. In this way, it is possible to obtain a solution containing scandium at still higher concentration by subjecting the acidic solution to be subjected to solvent extraction to a neutralization treatment and it is possible to improve the treatment efficiency of solvent extraction and to recover still higher purity scandium by subjecting this solution to solvent extraction.

More specifically, the method for recovering scandium according to the present embodiment includes a nickel oxide ore hydrometallurgical treatment step S1 of obtaining an acidic solution containing scandium by leaching nickel oxide ore with an acid such as sulfuric acid, a scandium elution step S2 of obtaining scandium eluate in which scandium is enriched by removing impurities from the acidic solution, a neutralization step S3 of neutralizing the scandium eluate by adding a neutralizing agent to the scandium eluate, a solvent extraction step S4 of extracting impurities into an extractant and separating the impurities from scandium remaining in the acidic solution after extraction by subjecting the eluate after neutralization to solvent extraction using an amine-based extractant, and a scandium recovering step S5 of recovering scandium from the raffinate liquid as illustrated in the flow diagram of FIG. 1.

<<2. Respective Steps in Method for Recovering Scandium>>

<2-1. Nickel Oxide Ore Hydrometallurgical Treatment Step>

As an acidic solution containing scandium to be the treatment target of scandium recovery, it is possible to use an acidic solution obtained by treating nickel oxide ore with sulfuric acid.

Specifically, as an acidic solution containing scandium, it is possible to use a post-sulfuration liquid obtained through the nickel oxide ore hydrometallurgical treatment step S1 which includes a leaching step S11 of leaching nickel oxide ore with an acid such as sulfuric acid under high temperature and high pressure to obtain a leachate; a neutralization step S12 of adding a neutralizing agent to the leachate to obtain a neutralized precipitate containing impurities and a post-neutralization liquid; and a sulfuration step S13 of adding a sulfurizing agent to the post-neutralization liquid to obtain nickel sulfide and a post-sulfuration liquid. The flow of the nickel oxide ore hydrometallurgical treatment step S1 will be described below.

(1) Leaching Step

The leaching step S11 is a step of adding sulfuric acid to a slurry of nickel oxide ore, for example, in a high temperature pressurized vessel (an autoclave) and the like and stirring the slurry at a temperature of 240° C. to 260° C. to form a leach slurry containing a leachate and a leach residue. Note that the treatment in the leaching step S11 may be performed in accordance with a conventionally known HPAL process and is described in, for example, Patent Document 1.

Here, examples of nickel oxide ore mainly include so-called laterite ore such as limonite ore and saprolite ore. The content of nickel in laterite ore is usually 0.8 to 2.5 wt %, and nickel is contained as a hydroxide or a silica magnesia (magnesium silicate) mineral. Further, these types of nickel oxide ore contain scandium.

In the leaching step S11, the leach slurry which contains a leachate and a leach residue and is thus obtained is separated into a leachate containing nickel, cobalt, scandium, and the like and a leach residue which is hematite by solid-liquid separation while being washed. In this solid-liquid separation treatment, for example, the leach slurry is mixed with the washing liquid, and then the solid-liquid separation treatment is performed by using a solid-liquid separation apparatus such as a thickener using a coagulant to be supplied from a coagulant supply facility and the like. Specifically, the leach slurry is first diluted with the washing liquid, and then the leach residue in the slurry is enriched as a precipitate in the thickener. Note that in this solid-liquid separation treatment, it is preferable to perform solid-liquid separation while washing the leach slurry in multiple stages by connecting the solid-liquid separation tank such as a thickener in multiple stages.

(2) Neutralization Step

The neutralization step S12 is a step of adding a neutralizing agent to the leachate obtained through the leaching step S11 described above to adjust the pH, thereby obtaining a neutralized precipitate containing impurity elements and a post-neutralization liquid. By the neutralization treatment in this neutralization step S12, valuable metals such as nickel, cobalt, and scandium will be contained in the post-neutralization liquid while most impurities including iron and aluminum will be contained in the neutralized precipitate.

As the neutralizing agent, conventionally known substances may be used, and examples thereof may include calcium carbonate, slaked lime, and sodium hydroxide.

In the neutralization treatment in the neutralization step S12, the pH is adjusted preferably to the range of 1 to 4 and more preferably to the range of 1.5 to 2.5 while suppressing oxidation of the leachate separated. When the pH is less than 1, neutralization may be insufficient, and the neutralized precipitate and the post-neutralization liquid may not be separated. Meanwhile, when the pH is more than 4, not only impurities including aluminum but also valuable metals such as scandium and nickel may be contained in the neutralized precipitate.

(3) Sulfuration Step

The sulfuration step S13 is a step of adding a sulfurizing agent to the post-neutralization liquid obtained through the neutralization step S12 described above to obtain nickel sulfide and a post-sulfuration liquid. By the sulfuration treatment in this sulfuration step S13, nickel, cobalt, zinc, and the like are converted into sulfides and scandium and the like are contained in the post-sulfuration liquid.

Specifically, in the sulfuration step S13, a sulfurizing agent such as gaseous hydrogen sulfide, sodium sulfide, or hydrogenated sodium sulfide is added to the post-neutralization liquid obtained to generate a sulfide (nickel.cobalt mixed sulfide) containing nickel and cobalt with less impurity components and a post-sulfuration liquid which has a low and stabilized level of nickel concentration and contains scandium and the like.

In the sulfuration treatment in the sulfuration step S13, the slurry of nickel.cobalt mixed sulfide is subjected to the precipitation and separation treatment using a sedimentation apparatus such as a thickener to separate and recover nickel.cobalt mixed sulfide from the bottom of the thickener. Meanwhile, the post-sulfuration liquid, which is an aqueous solution component, is overflown for recovery.

In the method for recovering scandium according to the present embodiment, a post-sulfuration liquid obtained through the respective steps in the nickel oxide ore hydrometallurgical treatment step S1 as described above can be used as an acidic solution which contains scandium and other impurities and is the target of the scandium recovery treatment.

<2-2. Scandium (Sc) Elution Step>

As described above, the post-sulfuration liquid, which is an acidic solution containing scandium and is obtained by leaching nickel oxide ore with sulfuric acid, can be applied as a target solution of the scandium recovery treatment. However, the post-sulfuration liquid, which is an acidic solution containing scandium, contains, for example, aluminum, chromium, and various other impurities which have remained in the solution without being sulfurized in the sulfuration treatment in the sulfuration step S13 described above in addition to scandium. Accordingly, when subjecting this acidic solution to solvent extraction, it is preferable to remove the impurities contained in the acidic solution, to enrich the scandium (Sc), and to generate a scandium eluate (scandium-containing solution) in advance as the scandium elution step S2.

In the scandium elution step S2, it is possible to separate and remove the impurities such as aluminum contained in the acidic solution and to obtain a scandium-containing solution in which scandium is enriched, for example, by a method through an ion exchange treatment using a chelating resin.

Figure 2:
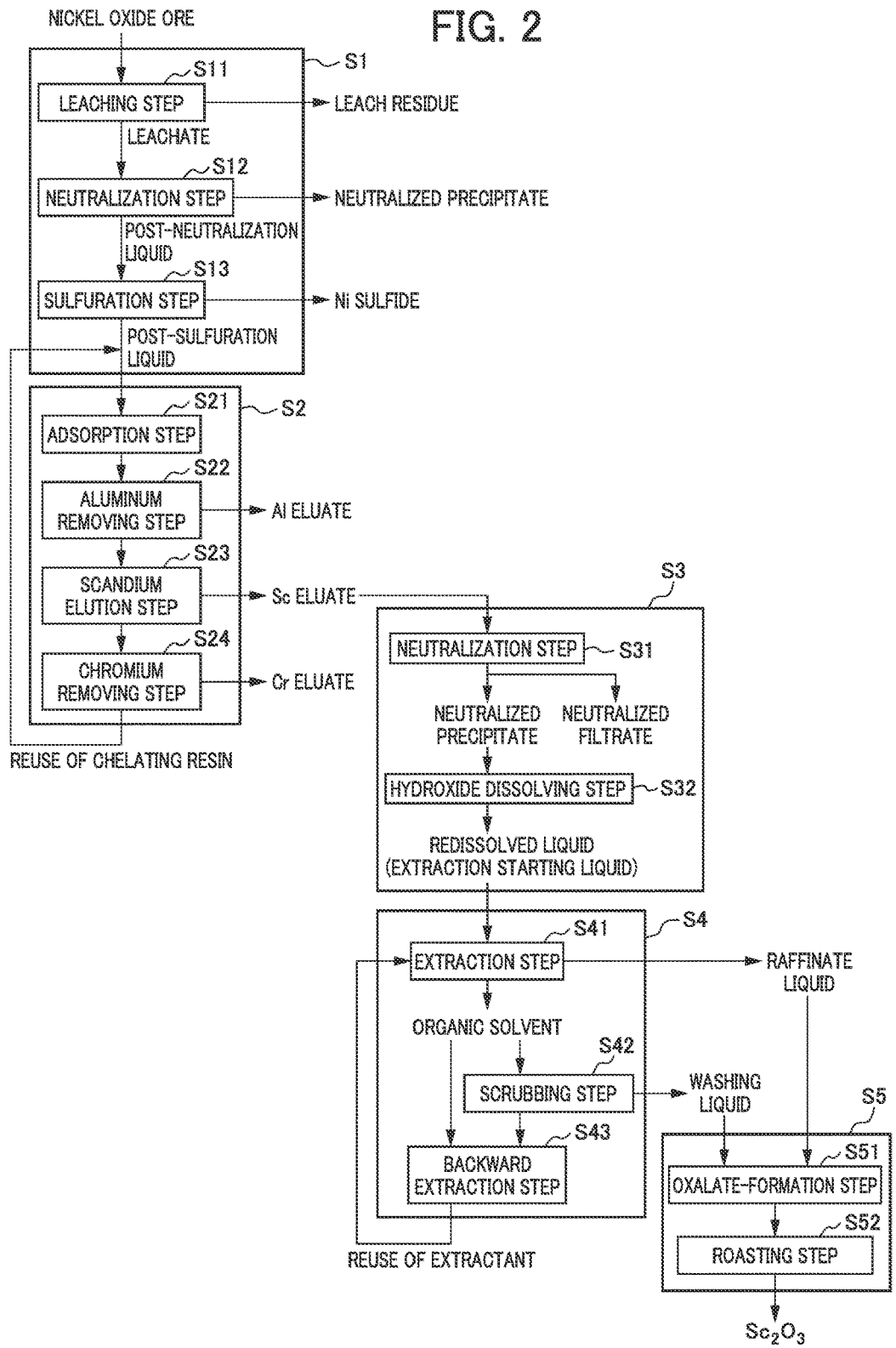
FIG. 2 is a flow diagram for explaining an example of the entire flow to which a method for recovering scandium is applied.

FIG. 2 is a flow diagram when illustrating an example of a method (ion exchange step) performed by an ion exchange reaction using a chelating resin as a method for removing impurities contained in an acidic solution and enriching and eluting scandium in the acidic solution in the method for recovering scandium. In this step, the post-sulfuration liquid obtained through the sulfuration step S13 in the nickel oxide ore hydrometallurgical treatment step S1 is brought into contact with the chelating resin to adsorb scandium in the post-sulfuration liquid to the chelating resin and thus to obtain a scandium (Sc) eluate. Note that the ion exchange step as an example of the scandium elution step S2 is referred to as the "ion exchange step S2".

Specifically, examples of the ion exchange step S2 may include a step which includes an adsorption step S21 of bringing the post-sulfuration liquid into contact with a chelating resin to adsorb scandium to the chelating resin; an aluminum removing step S22 of bringing sulfuric acid at 0.1 N or less into contact with the scandium-adsorbed chelating resin to remove aluminum adsorbed to the chelating resin; a scandium elution step S23 of bringing sulfuric acid at 0.3 N or more and 3 N or less into contact with the chelating resin to obtain a scandium eluate; and a chromium removing step S24 of bringing sulfuric acid at 3 N or more into contact with the chelating resin which has been subjected to the scandium elution step S23 to remove chromium which has been adsorbed to the chelating resin in the adsorption step S21. The respective steps will be briefly described below, but the ion exchange step S2 is not limited thereto.

[Adsorption Step]

In the adsorption step S21, the post-sulfuration liquid is brought into contact with a chelating resin to adsorb scandium to the chelating resin. There is no particular limitation for the kind of the chelating resin, and for example, a resin having iminodiacetic acid as a functional group can be used.

[Aluminum Removing Step]

In the aluminum removing step S22, the chelating resin which has adsorbed scandium in the adsorption step S21 is brought into contact with sulfuric acid at 0.1 N or less to remove aluminum adsorbed to the chelating resin. Note that when removing aluminum, the pH is preferably maintained in the range of between 1 or more and 2.5 or less and more preferably maintained in the range of between 1.5 or more and 2.0 or less.

[Scandium Elution Step]

In the scandium elution step S23, the chelating resin which has been subjected to the aluminum removing step S22 is brought into contact with sulfuric acid at 0.3 N or more and less than 3 N to obtain a scandium eluate. When obtaining the scandium eluate, the normality of sulfuric acid used as an eluent is preferably maintained in the range of between 0.3 N or more and less than 3 N, and more preferably maintained in the range of between 0.5 N or more and less than 2 N.

[Chromium Removing Step]

In the chromium removing step S24, the chelating resin which has been subjected to the scandium elution step S23 is brought into contact with sulfuric acid at 3 N or more to remove chromium which has been adsorbed to the chelating resin in the adsorption step S21. A normality of sulfuric acid used as an eluent of less than 3 N is not preferred when removing chromium because chromium may not be removed properly from the chelating resin.

<2-3. Neutralization Step>

As described above, scandium and impurities are separated from each other by the selectivity of the chelating resin and scandium separated from the impurities is recovered as a scandium eluate in the scandium elution step S2. However, not all impurities can be completely separated from scandium because of the properties of the chelating resin to be used.

Hence, separation of scandium from impurities can be further advanced by subjecting the scandium eluate recovered in the scandium elution step S2 to solvent extraction as an extraction starting liquid in the solvent extraction step S4 to be described later.

However, in the solvent extraction step S4, generally the performance to separate the intended component from the impurities other than the intended component is further improved as the concentration of the intended component in the extraction starting liquid to be subjected to the solvent extraction is higher. In addition, the liquid amount to be subjected to the solvent extraction decreases as the extraction starting liquid contains scandium at a higher concentration when the amount of scandium to be treated is the same, and as a result, the amount of extractant to be used also decreases. In addition, there are also various merits such as improvement in operation efficiency so that a more compact facility is required for the solvent extraction treatment.

Accordingly, in the present embodiment, in order to increase the concentration of scandium in the scandium eluate, that is, in order to enrich the scandium, a neutralizing agent is added to the scandium eluate eluted from the chelating resin to adjust the pH, a precipitate of scandium hydroxide is formed, and an acid is added to the precipitate of scandium hydroxide obtained to redissolve the precipitate of scandium hydroxide, thereby obtaining a solution (extraction starting liquid) having a higher concentration of scandium in the scandium elution step S2 (scandium elution step S23). The treatment efficiency of solvent extraction can be improved by subjecting the scandium eluate to a neutralization treatment and thus enriching scandium prior to the solvent extraction step S4 in this way.

In addition, an effect of separating impurities which are not converted into a precipitate can be expected as a precipitate containing scandium is temporarily formed from the scandium eluate by performing such a neutralization treatment and solid-liquid separation is performed.

Specifically, this neutralization step S3 includes a neutralization step S31 of adding a neutralizing agent to the scandium eluate to adjust the pH to a predetermined range and obtaining a neutralized precipitate and a neutralized filtrate and a hydroxide dissolving step S32 of adding an acid to the neutralized precipitate obtained to dissolve the neutralized precipitate and thus to obtain a redissolved liquid containing scandium at a high concentration as illustrated in FIG. 2.

[Neutralization Step]

In the neutralization step S31, a neutralizing agent is added to the scandium eluate to adjust the pH of the solution to the range of 5 to 6 and scandium contained in the scandium eluate is converted into a precipitate of scandium hydroxide. In the neutralization step S31, a neutralized precipitate composed of scandium hydroxide and a neutralized filtrate are generated in this way.

The neutralizing agent is not particularly limited, and for example, sodium hydroxide and the like can be used.

In addition, in the neutralization step S31, the pH adjustment by neutralization using a neutralizing agent may be performed in two stages, and impurities can be more efficiently separated by this.

Specifically, in the neutralization treatment by the two-stage pH adjustment, the first stage neutralization is first performed in which a neutralizing agent such as sodium hydroxide is added to the scandium eluate to adjust the pH of the solution to the range of 3.5 to 4.5 and preferably to about 4. By this first stage neutralization, most impurities such as iron and chromium, which are components exhibiting lower basicity than scandium, are converted into precipitates in the form of hydroxides and the primary neutralized precipitate and the primary neutralized filtrate are separated from each other through filtration.

Next, the second stage neutralization is performed in which a neutralizing agent such as sodium hydroxide is further added to the primary neutralized filtrate obtained by the first stage neutralization to adjust the pH of the filtrate to the range of 5.5 to 6.5 and preferably to about 6. By this second stage neutralization, scandium hydroxide is obtained as a secondary neutralized precipitate and nickel, which is a component exhibiting higher basicity than scandium, is not converted into a precipitate but remains in the secondary neutralized filtrate, and the secondary neutralized precipitate, that is, a hydroxide of scandium from which impurities have been separated, is obtained by subjecting this to solid-liquid separation.

The concentration of sodium hydroxide or the like to be used as a neutralizing agent in the neutralization treatment may be appropriately determined, but for example, when a neutralizing agent having a high concentration exceeding 4 N is added, a state can occur in which the pH locally increases in the reaction tank and the pH partially exceeds 4.5. In such a case, a harmful effect such as coprecipitation of scandium and impurities may be exhibited and high purity scandium may not be obtained. Hence, it is preferable to use a solution diluted to 4 N or less as the neutralizing agent and it is desirable that the neutralization reaction in the reaction tank proceeds as uniformly as possible by this.

Meanwhile, for example, it is not preferable that the concentration of a neutralizing agent such as a sodium hydroxide solution is too low since the amount of solution required for addition increases by that amount, thus the liquid amount to be handled increases, and as a result, the scale of facility increases and an increase in cost is caused. For this reason, it is preferable to use a neutralizing agent having a concentration of 1 N or more as the neutralizing agent.

Note that the precipitate, such as the primary neutralized precipitate or secondary neutralized precipitate described above, which is obtained by adding a neutralizing agent of an alkali such as sodium hydroxide normally exhibits extremely poor filtration property. Hence, upon neutralization, a seed crystal may be added to improve the filtration property. It is preferable to add the seed crystal in an amount of being about 1 g/L or more with respect to the solution before the neutralization treatment.

[Hydroxide Dissolving Step]

In the hydroxide dissolving step S32, an acid is added to the neutralized precipitate containing scandium hydroxide, which has been recovered through the one-stage or two-stage neutralization treatment in the neutralization step S31 described above, as a main component to dissolve the neutralized precipitate and thus to obtain a redissolved liquid. In the present embodiment, it is preferable that the redissolved liquid (post-neutralization eluate) thus obtained is subjected to the solvent extraction treatment to be described later as an extraction starting liquid.

The acid for dissolving the neutralized precipitate is not particularly limited, but it is preferable to use sulfuric acid. Note that the redissolved liquid is a scandium sulfate solution in the case of using sulfuric acid.

For example, in the case of using sulfuric acid, the concentration is not particularly limited, but it is preferable to dissolve the neutralized precipitate using a sulfuric acid solution having a concentration of 2 N or more in consideration of the industrial reaction rate.

Note that an extraction starting liquid having an arbitrary concentration of scandium can be obtained by adjusting the slurry concentration at the time of dissolution using sulfuric acid or the like. For example, in the case of dissolving the neutralized precipitate by adding sulfuric acid at 2 N, it is preferable to maintain the pH of the solution at 1, and dissolution of scandium hydroxide can be efficiently performed and loss of scandium recovery due to undissolution can be suppressed by dissolving scandium hydroxide so as to maintain this pH.

<2-4. Solvent Extraction Step>

Next, in the solvent extraction step S4, the redissolved liquid (post-neutralization eluate) obtained through the neutralization step S3 in which the scandium eluate is subjected to a neutralization treatment is brought into contact with an extractant to obtain a raffinate liquid containing scandium. Note that the redissolved liquid to be subjected to solvent extraction is an acidic solution containing scandium and other impurity elements as described above and is also referred to as a "scandium-containing solution".

The aspect in the solvent extraction step S4 is not particularly limited, but for example, it is preferable to perform a solvent extraction treatment which includes an extraction step S41 of mixing the scandium-containing solution with an extractant, which is an organic solvent, and separating the mixture into a post-extraction organic solvent into which impurities and a slight amount of scandium are extracted and a raffinate liquid in which scandium remains, a scrubbing step S42 of mixing the post-extraction organic solvent with a sulfuric acid solution and separating the slight amount of scandium extracted into the post-extraction organic solvent into an aqueous phase to obtain a post-washing liquid, and a backward extraction step S43 of adding backward extractant to the post-washing organic solvent and performing backward extraction of impurities from the post-washing organic solvent as illustrated in FIG. 1 and FIG. 2.

(1) Extraction Step

In the extraction step S41, the scandium-containing solution and an organic solvent containing an extractant are mixed, impurities are selectively extracted into the organic solvent, and an organic solvent containing impurities and a raffinate liquid are obtained. In the method for recovering scandium according to the present embodiment, in this extraction step S41, a solvent extraction treatment using an amine-based extractant is performed. It is possible to more efficiently and effectively extract impurities and to separate the impurities from scandium by performing a solvent extraction treatment using an amine-based extractant.

Here, the amine-based extractant exhibits low selectivity for scandium and has features that a neutralizing agent is not required at the time of extraction, and for example, it is possible to use an amine-based extractant known under the trade names of Primene JM-T, which is a primary amine, LA-1, which is a secondary amine, and TNOA (tri-n-octylamine) and TIOA (tri-i-octylamine), which are tertiary amines.

At the time of extraction, it is preferable that the amine-based extractant is diluted with, for example, a hydrocarbon-based organic solvent and the like and then used. The concentration of the amine-based extractant in the organic solvent is not particularly limited, but it is preferably about 1 vol % or more and 10 vol % or less, in particular, it is more preferably about 5 vol % when the phase separation property at the time of extraction and at the time of backward extraction to be described later is taken into consideration.

In addition, the volume proportion of the organic solvent to the scandium-containing solution at the time of extraction is not particularly limited, and it is preferable to set the molar quantity of the organic solvent to about 0.01 time or more and 0.1 time or less with respect to the molar quantity of metals in the scandium-containing solution.

(2) Scrubbing (Washing) Step

In a case in which scandium slightly coexists in the solvent obtained by extracting impurities from the scandium-containing solution in the extraction step S41 described above, before backward extraction of the extraction liquid obtained through the extraction step S41, the organic solvent (organic phase) is subjected to a scrubbing (washing) treatment and scandium is separated into an aqueous phase and recovered from the extractant (scrubbing step S42).

It is possible to separate scandium into the washing liquid and to further increase the recovery rate of scandium as the organic solvent is washed and a slight amount of scandium extracted by the extractant is separated by providing the scrubbing step S42 in this way.

As a solution (washing solution) used for scrubbing, a sulfuric acid solution, a hydrochloric acid solution, or the like can be used. In addition, it is also possible to use one to which a chloride or sulfate soluble in water is added. Specifically, when a sulfuric acid solution is used as the washing liquid, it is preferable to use one having a concentration range of between 1.0 mol/L or more and 3.0 mol/L or less.

The number of washing stages (number of times) also depends on the kind and concentration of the impurity elements and thus it can be appropriately changed depending on the amine-based extractant used, extraction conditions, and the like. For example, in a case in which the phase ratio O/A of the organic phase (O) to the aqueous phase (A) is set to 1, scandium extracted into the organic solvent can be separated to a concentration less than the lower detection limit of the analyzer by setting the number of washing stages to about 3 to 5 stages.

(3) Backward Extraction Step

In the backward extraction step S43, impurities are backward extracted from the organic solvent into which the impurities have been extracted in the extraction step S41. Specifically, in the backward extraction step S43, a backward extraction solution (backward extraction starting liquid) is added to and mixed with an organic solvent containing an extractant to cause a reaction opposite to that in the extraction treatment in the extraction step S41, thus the impurities are backward extracted and a post-backward extraction liquid containing impurities is obtained.

As described above, impurities are selectively extracted using an amine-based extractant in the extraction treatment in the extraction step S41. Accordingly, it is preferable to use a solution containing a carbonate such as sodium carbonate or potassium carbonate as the backward extraction solution from the viewpoint of effectively separating the impurities from the organic solvent containing an extractant and regenerating the extractant.

From the viewpoint of suppressing excessive use, it is preferable that the concentration of the solution containing a carbonate, which is the backward extraction solution, is set to, for example, about 0.5 mol/L or more and 2 mol/L or less.

Note that the backward extraction treatment can be performed by adding a backward extraction solution to the extractant after scrubbing and mixing these together in the same manner in a case in which the organic solvent containing an extractant is subjected to a scrubbing treatment in the scrubbing step S42 described above.

In this way, the extractant after the extraction or the extractant after a carbonate solution such as sodium carbonate is added to the extractant after the scrubbing and the backward extraction treatment is performed to separate impurities can be repeatedly used as an extractant in the extraction step S41.

<2-5. Scandium Recovery Step>

Next, in the scandium recovering step S5, scandium is recovered from the raffinate liquid obtained through the extraction step S41 in the solvent extraction step S4 and from the washing liquid after the scrubbing in the case of performing scrubbing by the scrubbing step S42.

The method for recovering scandium is not particularly limited, and a known method can be used, but for example, it is more preferable to use a method (oxalate-formation treatment) in which oxalic acid is added and scandium is thus recovered as a precipitate of an oxalate than a method in which an alkali is added for neutralization and scandium is thus recovered as a precipitate of scandium hydroxide and the like since impurities can be still more effectively separated.

In the recovery method using an oxalate-formation treatment, oxalic acid is added to the raffinate liquid and the washing liquid to generate a precipitate of scandium oxalate and then scandium oxalate is dried and roasted to recover scandium as scandium oxide.

[Oxalate-Formation Step]

In the oxalate-formation step S51, a predetermined amount of oxalic acid is added to the raffinate liquid and washing liquid obtained through the solvent extraction step S4 to precipitate scandium as a solid of scandium oxalate and the scandium oxalate is separated.

The amount of oxalic acid added is not particularly limited, but it is preferably set to be 1.05 times or more and 1.2 times or less the equivalent amount required to precipitate scandium contained in the raffinate liquid and the like as an oxalate. Note that the amount of oxalic acid $((COOH)_2)$ required to convert scandium (Sc) to scandium oxalate ($Sc_2(C_2O_4)$) is defined as 1 equivalent.

The entire amount of scandium may not be recovered when the amount of oxalic acid added is less than 1.05 times the equivalent amount required for precipitation. Meanwhile, when the amount of oxalic acid added exceeds 1.2 times the equivalent amount required for precipitation, scandium is redissolved by an increase in the solubility of scandium oxalate to be obtained and the recovery rate of scandium decreases or the amount of oxidizing agent, such as sodium hypochlorite, used increases in order to decompose excessive oxalic acid.

Specifically, in the oxalate-formation step S51, sulfuric acid or the like is added to the scandium-containing solution such as the raffinate liquid to obtain a scandium-containing solution of which the pH is adjusted to the range of between −0.5 or more and less than 1. Next, a crystal of scandium oxalate is obtained by mixing this scandium-containing solution after the pH adjustment with an oxalic acid solution.

In the pH adjustment by sulfuric acid or the like, precipitation of impurities such as divalent iron ions and aluminum ions contained in the solution may occur when the pH of the solution reaches 1 or more. Meanwhile, in an extremely strong acidic region in which the pH is less than − (minus) 0.5, the solubility of scandium oxalate to be crystallized increases, thus the amount of a crystal to be obtained may decrease, and the yield may decrease.

The crystals of scandium oxalate thus obtained are recovered by solid-liquid separation and then subjected to a treatment in the roasting step S52 to be described later to be converted into high purity scandium oxide.

[Roasting Step]

The roasting step S52 is a step of washing the precipitate of scandium oxalate obtained through the oxalate-formation step S51 with water, drying the precipitate, and then roasting the precipitate. Scandium can be recovered as extremely high purity scandium oxide by being subjected to this roasting treatment.

The condition for the roasting treatment is not particularly limited, but for example, the precipitate of scandium oxalate may be placed in a tubular furnace and heated at about 900° C. for about 2 hours. Note that it is preferable to use a continuous furnace such as a rotary kiln for industrial production since both drying and roasting can be performed by using the same apparatus.

EXAMPLES

Below, the present invention will be described in more detail with reference to Examples, the present invention shall not in any sense be limited to these Examples.

Example 1

[Preparation of Scandium-Containing Solution (Pre-Extraction Original Liquid)]

Based on a known method such as the method described in Patent Document 1, nickel oxide ore was subjected to pressure acid leaching using sulfuric acid, the pH of the leachate thus obtained was adjusted to remove impurities, and then a sulfurizing agent is added to separate nickel, thereby preparing a post-sulfuration liquid. Note that the main composition of the post-sulfuration liquid is shown in the following Table 1.

Note that the grade as scandium hydroxide was only about 0.1 wt % even in a case in which a precipitate was generated by adding a neutralizing agent to a solution having this composition and a hydroxide containing scandium and other impurity components was obtained.

TABLE 1

| Composition of post-sulfuration liquid | Sc | Al | Fe |
|---|---|---|---|
| [mg/L] | 14 | 2,800 | 1,000 |

Next, from the viewpoint of confirming the separation and purification effect, impurities were added to the post-sulfuration liquid thus obtained in the form of a reagent, if necessary, in order to take the elemental components which were not contained in the original nickel oxide ore as a target as well and the solution was subjected to an ion exchange treatment by a known method using a chelating resin. In addition, an enriching treatment was performed by a method such as heating and a pre-extraction original liquid having the composition shown in the following Table 2 was thus obtained. The composition of the pre-extraction original liquid is shown in Table 2.

The term "others" in the column for components in Table 2 and the subsequent tables is a generic name for elements such as nickel, magnesium, chromium, manganese, calcium, and cobalt contained in nickel oxide ore, and an element derived from a neutralizing agent and the like to be added when treating the nickel oxide ore, and various elements such as actinoid elements which are prepared using reagents in the present Example and are not normally present or are present only in trace amounts, and it is written as the sum of the analytical values of these components detected. Note that aluminum and iron are not included in "others" in the present Example.

TABLE 2

| Composition of pre-extraction original liquid | Sc | Al | Fe | Others |
|---|---|---|---|---|
| [mg/L] | 20,000 | 11,000 | 4,200 | 2,100 |

[Solvent Extraction]
[Extraction Step]

Next, 100 liters of a solution having the composition shown in Table 2 was used as an extraction starting liquid, this was mixed with 50 liters of an organic solvent in which an amine-based extractant (Primene JM-T, manufactured by The Dow Chemical Company) was adjusted to 5 vol % using a solvent (ShellSol A150, manufactured by Shell Japan Limited), and the mixture was stirred at room temperature for 60 minutes to perform a solvent extraction treatment, thereby obtaining a raffinate liquid containing scandium. Note that clad was not formed and phase separation after being allowed to still stand also quickly proceeded at the time of extraction.

The compositions of the respective elements contained in the extraction organic phase obtained by this extraction were analyzed. The percentages of the values obtained by dividing the amounts of various kinds of elements contained in the extraction organic phase by the amounts of the respective elements contained in the pre-extraction original liquid were calculated and the results thereof are shown in the following Table 3 as the extraction rate (%).

TABLE 3

| Extraction rate of various kinds of elements | Sc | Al | Fe | Others |
|---|---|---|---|---|
| [%] | 4 | — | — | 23 |

(Note that "—" in Table 3 indicates that it was not analyzed or was less than the lower measurement limit.)

As can be seen from the results for the extraction rate shown in Table 3, a large amount of scandium (Sc) contained in the pre-extraction original liquid was distributed in the raffinate liquid through the extraction step and it was possible to separate a large number of other impurities although Al, Fe, and the like were not extracted.

Note that the influence that a large amount of aluminum and iron was not separated was significant even when a neutralizing agent was added to the raffinate liquid obtained and a precipitate containing a hydroxide of scandium was recovered and the grade of scandium hydroxide itself was not much improved to be about 49 wt % to 50 wt %.

[Scrubbing (Washing) Step]

Subsequently, 50 liters of a sulfuric acid solution having a concentration of 1 mol/L was mixed with 50 liters of the organic solvent (extraction organic phase) which contained scandium and was obtained through the extraction step so as to have a phase ratio (O/A) of 1, and washing was performed by stirring the mixture for 60 minutes. Thereafter, the resultant mixture was allowed to still stand, the aqueous phase was separated, the organic phase was again mixed with 50 liters of a fresh sulfuric acid solution having a concentration of 1 mol/L and washed, and the aqueous phase was separated in the same manner. Such a washing operation was repeated five times in total.

By washing the extraction organic phase five times, scandium contained in the extraction organic phase was able to be separated into the aqueous phase and recovered. Meanwhile, the impurities contained in the extraction organic phase were only eluted at a low level of 1 mg/L, and it was possible to effectively separate only scandium extracted into the organic solvent into the aqueous phase and to remove only the impurities.

[Backward Extraction Step]

Subsequently, sodium carbonate having a concentration of 1 mol/L was mixed with the extraction organic phase after the washing so as to have a phase ratio O/A=1/1, the mixture was stirred for 60 minutes to perform a backward extraction treatment, and thus the impurities were backward extracted into the aqueous phase.

The compositions of various kinds of elements contained in the post-backward extraction liquid obtained by this backward extraction operation were analyzed. The percentages of the values obtained by dividing the amounts of various kinds of elements contained in the post-backward extraction liquid by the amounts of various kinds of elements extracted into the organic phase in the extraction step were calculated and the results thereof are shown in the following Table 4 as the recovery rate (%).

TABLE 4

| Recovery rate of various kinds of elements | Sc | Al | Fe | Others |
|---|---|---|---|---|
| [%] | 25 | — | — | >99 |

(Note that "—" in Table 4 indicates that it was not analyzed or was less than the lower measurement limit.)

As can be seen from the results for the recovery rate shown in Table 4, it was possible to separate most impurities contained in the pre-extraction original liquid into the extractant and to recover most scandium which was able to be recovered from the raffinate liquid and the post-washing liquid by performing the solvent extraction treatment described above.

[Oxalate-Formation Step]

Next, crystals of oxalic acid.dihydrate (manufactured by MITSUBISHI GAS CHEMICAL COMPANY, INC.) was dissolved in the raffinate liquid thus obtained so as to be two times the amount of scandium contained in the raffinate liquid as a calculated amount, and the solution was stirred and mixed for 60 minutes to generate a white crystalline precipitate of scandium oxalate.

[Roasting Step]

Next, the precipitate of scandium oxalate thus obtained was suction filtered, washed with pure water, and dried at 105° C. for 8 hours. Subsequently, the scandium oxalate dried was placed in a tubular furnace and roasted (calcined) at 850° C. to 900° C., thereby obtaining scandium oxide.

Scandium oxide obtained by roasting was analyzed by emission spectral analysis. The removal rate (%) obtained by dividing the amount of substance after roasting by the amount of substance contained before the oxalate-formation step is shown in the following Table 5.

TABLE 5

| Removal rate of various kinds of elements | Sc | Al | Fe | Others |
|---|---|---|---|---|
| [%] | 0 | 100 | 99.9 | 99 |

As can be seen from the results for the removal rate shown in Table 5, it was possible to almost completely remove aluminum, iron, and impurities other than scandium and to obtain extremely high purity scandium oxide having a purity of more than 99.9 wt % as scandium oxide ($Sc_2O_3$).

Comparative Example 1

The same ore as in Example 1 was leached with sulfuric acid and the leachate was subjected to the neutralization treatment and then allowed to pass through an ion exchange resin, thereby obtaining a pre-extraction original liquid having the composition shown in Table 2 above. This solution was directly subjected to the oxalate-formation step described above without being subjected to the solvent extraction step. The same method as in Example 1 was used other than this.

As a result, it was not possible to separate other impurity components although it was possible to almost completely separate aluminum and iron, the purity of scandium oxide ($Sc_2O_3$) after roasting was 99.2 wt % and this was lower than the purity of scandium oxide obtained by the method of Example 1 in which a solvent extraction treatment and an oxalate-formation treatment were combined.

Example 2

The post-sulfuration liquid which was used in Example 1 and had the same composition as that described in Table 1 above was subjected to an ion exchange treatment by the same method as in Example 1. Thereafter, sodium hydroxide was added to the scandium eluate thus obtained to adjust the pH to 6 and the scandium eluate was subjected to a neutralization treatment to generate a neutralized precipitate, subsequently, sulfuric acid was added to the neutralized precipitate (scandium hydroxide) thus obtained to dissolve the neutralized precipitate again, reagents were added in the same manner as in Example 1 if necessary, and the like, whereby a chelate eluate (hydroxide solution) having the composition shown in the following Table 6 was obtained and used as a pre-solvent extraction original liquid.

TABLE 6

| Composition of pre-extraction original liquid | Sc | Al | Fe | Others |
|---|---|---|---|---|
| [mg/L] | 22,000 | 3,500 | 1,000 | 26 |

The chelate eluate (hydroxide solution) having the composition shown in Table 6 was used as an extraction starting liquid and this was subjected to solvent extraction using an amine-based extractant. Note that Primene JM-T (manufactured by The Dow Chemical Company) was used as an amine-based extractant, and this was diluted to 5 vol % with a solvent (ShellSol A150, manufactured by Shell Japan Limited) in the same manner as in Example 1. The pH at extraction equilibrium was set to 1, and the organic amount (O) and the amount of extraction starting liquid (A) were selected based on the ratio of the organic amount and the metal amount in the liquid as in the extraction conditions shown in the following Table 7.

TABLE 7

| (Extraction conditions) | Organic liquid amount [ml] | Aqueous phase liquid amount [ml] | Organic/metal [mol/mol] | O/A |
|---|---|---|---|---|
| Example 2-1 | 100 | 200 | 0.02 | 0.5 |
| Example 2-2 | 150 | 200 | 0.03 | 0.75 |
| Example 2-3 | 200 | 200 | 0.04 | 1 |

Figure 3:
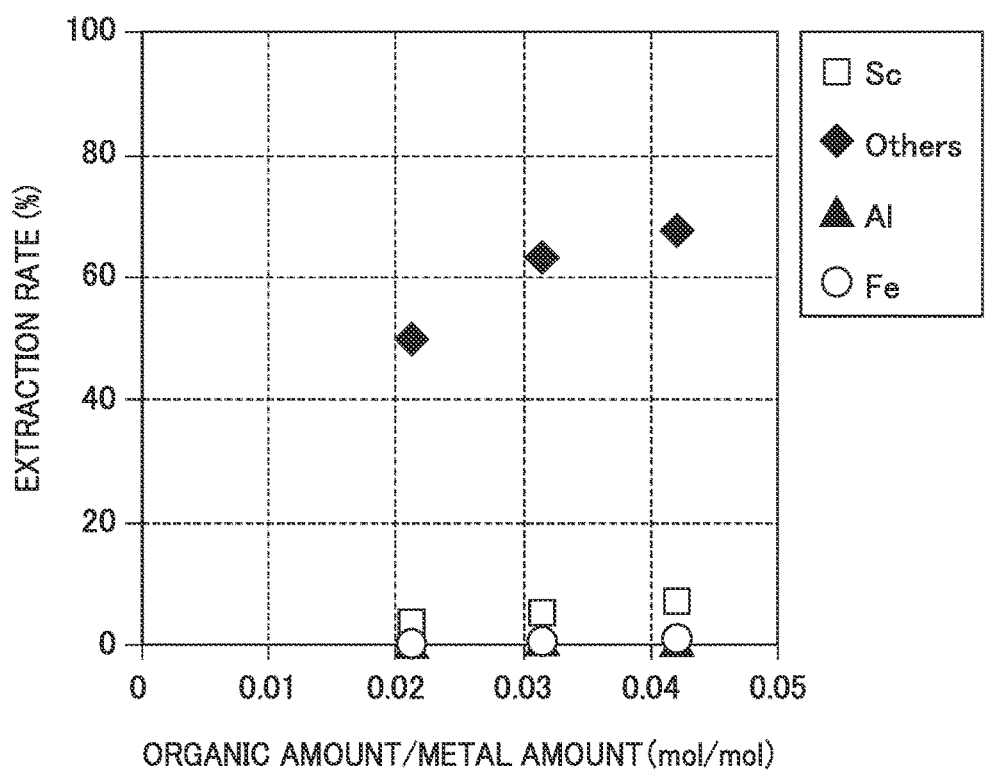
FIG. 3 is a graph for illustrating the extraction rates of Sc, Al, Fe, and other impurities (others) contained in an organic solvent after a solvent extraction treatment in Examples.

FIG. 3 is a graph for illustrating the results for the extraction rates (%) of Sc, Al, Fe, and other impurities (others) contained in the organic solvent after the solvent extraction. Note that the percentages of the values obtained by dividing the amounts of various kinds of elements contained in the extraction organic phase by the amounts of the respective elements contained in the pre-extraction original liquid were taken as the extraction rate.

As can be seen from the graph of FIG. 3, it has been found that scandium and other impurities can be efficiently separated from each other by solvent extraction using an amine-based extractant, and as a result, scandium can be enriched in the raffinate liquid in a case in which the organic amount/metal amount (unit: mol/mol, hereinafter the same applies), which is the ratio of the organic amount to the metal amount, is in the range of between 0.01 or more and 0.1 or less. Specifically, the extraction rate of impurities is 50% but the extraction rate of scandium is 4% in a case in which O/A is 0.5 (organic amount/metal amount=0.02).

Note that it is not preferable that the organic amount/metal amount is less than 0.01 time since phase separation between the organic phase and the aqueous phase is poor. In addition, it is not preferable that the organic amount/metal amount exceeds 0.1 time since a large amount of scandium is contained in the organic phase.

Subsequently, the organic solvent after extraction of scandium according to Example 2-3 was mixed with sulfuric acid and subjected to a washing treatment. Note that the concentration condition of sulfuric acid used for washing is shown in the following Table 8.

TABLE 8

|  | Concentration of sulfuric acid [mol/L] |
|---|---|
| Example 2-3-1 | 1 |
| Example 2-3-2 | 3 |
| Example 2-3-3 | 4 |
| Example 2-3-4 | 5 |
| Example 2-3-5 | 6 |
| Example 2-3-6 | 7 |
| Example 2-3-7 | 8 |

Figure 4:
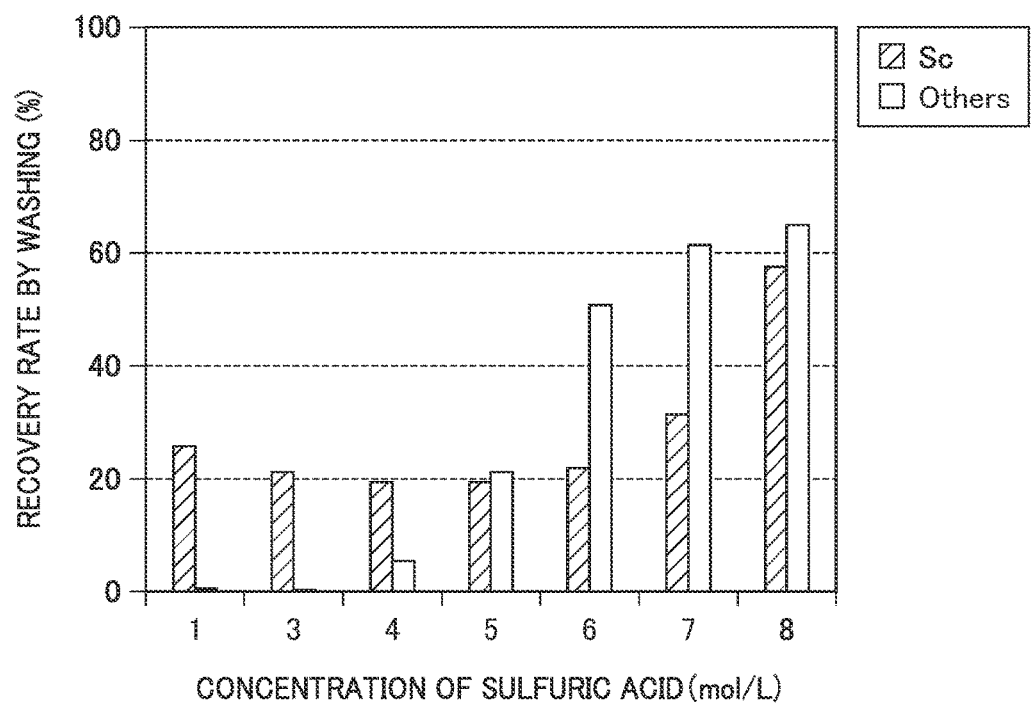
FIG. 4 is a graph for illustrating the relationship between the concentration of sulfuric acid and the washing rate (recovery rate by washing) of scandium (Sc) and other impurities (others) when a sulfuric acid solution as a washing liquid is added to the extractant after solvent extraction and a scrubbing (washing) treatment is performed in Examples.

FIG. 4 is a graph for illustrating the relationship between the concentration of sulfuric acid used for washing and the washing rate of scandium and other impurities (others). Here, the washing rate refers to the proportion of the metal which is separated from the organic solvent and contained in sulfuric acid.

As can be seen from the graph of FIG. 4, it was possible to separate and recover scandium from the organic solvent at any concentration of sulfuric acid but it was possible to efficiently separate and recover only scandium from the organic solvent while leaving the impurities in the organic solvent particularly in a case in which the concentration of sulfuric acid was 1 mol/L or more and 3 mol/L or less.

Example 3

Various impurities were added to the post-sulfuration liquid which was used in Example 1 and had the same composition as that described in Table 1 above as reagents in the same manner as in Example 1 if necessary, an ion exchange treatment using a chelating resin was further performed by the same method as in Example 1, and sulfuric acid was allowed to pass through the chelating resin after the ion exchange treatment, thereby obtaining a scandium eluate having the composition shown in the following Table 9.

TABLE 9

| Scandium eluate | Sc | Al | Fe | Ni | Cr |
|---|---|---|---|---|---|
| [mg/L] | 100 | 30 | 40 | 10 | 2 |

The scandium eluate thus obtained was placed in a container and adjusted so as to have a pH of 1 by addition of a sodium hydroxide solution having a concentration of 4 N while being stirred. Subsequently, stirring was stopped, the solution was allowed to still stand, the liquid amount was measured, and the supernatant liquid after precipitation of the precipitate was collected, thereafter, stirring was restarted, and a sodium hydroxide solution having a concentration of 4 N was again added to the solution to adjust the pH of the solution to 2. Thereafter, it was repeated that stirring was stopped, the solution was allowed to still stand, the liquid amount was measured, the supernatant liquid was collected, and stirring was performed again, thereby preparing samples for the respective scandium eluates having a pH in the range of 1 to 6.

The respective samples thus prepared were subjected to analysis of the components shown in Table 9 using ICP. Note that the amount calculated from the analytical value of each component and the liquid amount for each sampling is the amount of the component present in the solution at each pH. The difference between this amount of the component present in the solution and the initial amount calculated from the analytical value of the scandium eluate and the initial liquid amount shown in Table 9 corresponds to the amount of precipitate generated by pH adjustment (neutralization). The proportion obtained by dividing this amount of precipitate by the initial amount described above was defined as the precipitation rate (%).

Figure 5:
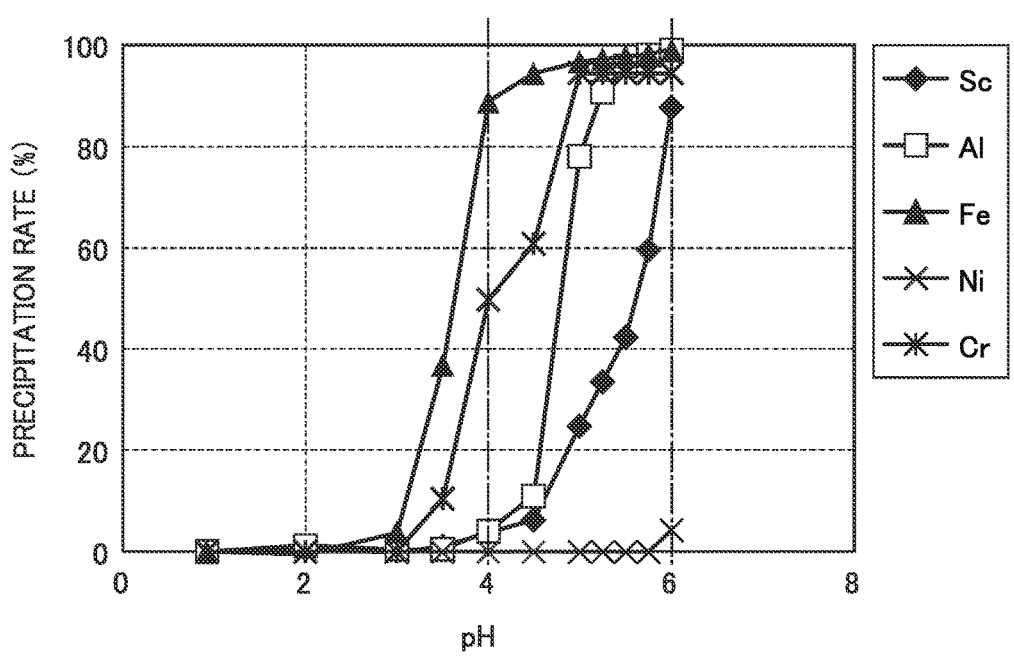
FIG. 5 is a graph for illustrating the pH of a solution when a neutralizing agent is added to an eluate eluted from a chelating resin and the proportion (precipitation rate) of each element precipitated from the solution.

The respective pHs and the precipitation rates of the components shown in Table 9 are illustrated in FIG. 5. As illustrated in the graph of FIG. 5, it can be seen that the precipitation rate of iron increases in the region in which the pH is 3 or more and iron almost completely precipitates when the pH is 4.5 to 5 or more. In addition, it can be seen that the precipitation rate of aluminum increases when the pH exceeds 4.5. Meanwhile, it can be seen that the precipitation rate of scandium also increases when the pH exceeds 4.5 but the increase is more moderate than that of aluminum. Note that nickel begins to precipitate when the pH begins to exceed 6.

Based on the results illustrated in FIG. 5, a sodium hydroxide solution having a concentration of 4 N was added to the scandium eluate having the composition shown in Table 9, the scandium eluate was neutralized so as to have a pH between 5 and 6, a precipitate was thus generated, and then solid-liquid separation was performed, thereby obtaining a precipitate of scandium hydroxide.

Next, sulfuric acid solution having a concentration of 2 N was added to the scandium hydroxide thus obtained, the scandium hydroxide was dissolved while maintaining the pH at around 1, thereby obtaining a redissolved liquid having the composition shown in the following Table 10.

TABLE 10

| Composition of pre-extraction original liquid | Sc | Al | Fe |
|---|---|---|---|
| [g/L] | 20 | 10 | 4 |

Next, in the same manner as in Example 1, the redissolved liquid thus obtained was subjected to solvent extraction as an extraction starting liquid and scandium oxalate was generated from the raffinate liquid thus obtained and then roasted, thereby obtaining scandium oxide. As a result, it was possible to obtain scandium oxide having a lower iron grade than in Example 1.

Example 4

Various impurities were added to the post-sulfuration liquid which was used in Example 1 and had the same composition as that described in Table 1 above as reagents in the same manner as in Example 1 if necessary, an ion exchange treatment using a chelating resin was further performed by the same method as in Example 1, and sulfuric acid was allowed to pass through the chelating resin after the ion exchange treatment, thereby obtaining a scandium eluate having the composition shown in Table 9 above.

The scandium eluate thus obtained was placed in a container and subjected to the first stage neutralization in which the scandium eluate was adjusted so as to have a pH of 4 by addition of a sodium hydroxide solution having a concentration of 4 N while being stirred. Thereafter, solid-liquid separation was performed using filter paper and Nutsche to obtain a primary neutralized precipitate and a primary neutralized filtrate. Subsequently, the proportion (distribution) of the amount of substances precipitated to the amount of substances contained in the scandium eluate (Table 9) before the pH adjustment was analyzed as the precipitation rate (%) using ICP.

The precipitation rate (distribution) by the first stage neutralization is shown in the following Table 11. As shown in Table 11, it was possible to effectively precipitate iron and chromium, which were impurities in the solution, and to separate these from scandium distributed in the primary neutralized filtrate by performing neutralization until the pH of the solution reached 4.

TABLE 11

| Precipitation rate of each elemental component | Sc | Al | Fe | Ni | Cr |
|---|---|---|---|---|---|
| [%] | 4 | 4 | 89 | 0 | 50 |

Next, the primary neutralized filtrate thus obtained was placed in a container and subjected to the second stage neutralization in which the primary neutralized filtrate was adjusted so as to have a pH of 6 by addition of sodium hydroxide solution having a concentration of 4 N. Thereafter, solid-liquid separation was performed in the same manner as the treatment in the first stage neutralization to obtain a secondary neutralized precipitate and a secondary neutralized filtrate. Subsequently, the proportion (distribution) of the amount of substances precipitated to the amount of substances contained in the primary neutralized filtrate was analyzed as the precipitation rate (%) using ICP.

The precipitation rate (distribution) by the second stage neutralization is shown in the following Table 12. As shown in Table 12, nearly 90% of scandium remained in the filtrate without being precipitated by the first stage neutralization was distributed in the secondary neutralized precipitate by the second stage neutralization. Meanwhile, nickel exhibiting higher basicity than scandium remained in the secondary neutralized filtrate without being precipitated by both the first stage neutralization and the second stage neutralization and was able to be effectively separated from scandium.

TABLE 12

| Precipitation rate of each elemental component | Sc | Al | Fe | Ni | Cr |
|---|---|---|---|---|---|
| [%] | 88 | 99 | 99 | 4 | 94 |

Note that, among the components in the scandium eluate shown in Table 9, most of iron and chromium are precipitated even by the second stage neutralization but most of these components are already distributed in the primary neutralized precipitate and separated from scandium by the first stage neutralization and the amount of these components to be distributed in the secondary neutralized precipitate itself is suppressed.

It has been found that the proportion (precipitation rate) of aluminum distributed in the secondary neutralized precipitate is noticeable other than scandium among the components contained in the scandium eluate and iron, chromium, nickel, and the like other than these are effectively separated as shown in the following Table 13 by performing such a two-stage neutralization treatment.

TABLE 13

| Precipitation rate of each elemental component | Sc | Al | Fe | Ni | Cr |
|---|---|---|---|---|---|
| [%] | 82 | 99 | 6 | 4 | 31 |

Next, a sulfuric acid solution having a concentration of 2 N was added to the secondary neutralized precipitate thus obtained and the secondary neutralized precipitate was dissolved while maintaining the pH at around 1, thereby obtaining a redissolved liquid shown in the following Table 14.

TABLE 14

| Redissolved liquid | Sc | Al | Fe |
|---|---|---|---|
| [g/L] | 20 | 7.2 | 0.6 |

Next, in the same manner as in Example 1, the redissolved liquid thus obtained was subjected to solvent extraction as an extraction starting liquid and scandium oxalate was generated from the raffinate liquid thus obtained and then roasted, thereby obtaining scandium oxide. As a result, it was possible to obtain scandium oxide having a lower iron grade than in Example 1.

The invention claimed is:

1. A method for recovering scandium, comprising:
a scandium elution step of allowing a solution containing scandium to pass through an ion exchange resin and obtaining an eluate containing scandium from the ion exchange resin;
a neutralization step of neutralizing the eluate by adding a neutralizing agent to the eluate;
a solvent extraction step of subjecting a post-neutralization eluate to solvent extraction using an amine-based extractant; and
a scandium recovering step of obtaining a precipitate of scandium from a raffinate liquid separated by solvent extraction and obtaining scandium oxide by roasting the precipitate.

2. The method for recovering scandium according to claim 1, wherein scrubbing to mix a sulfuric acid solution having a concentration of 1.0 mol/L or more and 3.0 mol/L or less as a washing liquid with an extractant after solvent extraction and to separate scandium contained in the extractant into the washing liquid is performed in the solvent extraction step and
a precipitate of scandium is obtained from the washing liquid after scrubbing along with the raffinate liquid in the scandium recovering step.

3. The method for recovering scandium according to claim 1, wherein a carbonate is added to an extractant after solvent extraction and backward extraction is performed to obtain an extractant after backward extraction and a backward extraction liquid in the solvent extraction step.

4. The method for recovering scandium according to claim 3, wherein the extractant after backward extraction is repeatedly used as the extractant for solvent extraction.

5. The method for recovering scandium according to claim 1, wherein a neutralizing agent is added to the eluate to adjust a pH to a range of 5 to 6, a neutralized precipitate and a neutralized filtrate are generated by solid-liquid separation, and an acid is added to the neutralized precipitate to obtain a redissolved liquid in the neutralization step and
the redissolved liquid obtained is subjected to solvent extraction as the post-neutralization eluate in the solvent extraction step.

6. The method for recovering scandium according to claim 1, wherein in the neutralization step,
a neutralizing agent is added to the eluate to adjust a pH to a range of 3.5 to 4.5, a primary neutralized precipitate and a primary neutralized filtrate are generated by solid-liquid separation,
subsequently a neutralizing agent is further added to the primary neutralized filtrate to adjust a pH to a range of 5.5 to 6.5, a secondary neutralized precipitate and a secondary neutralized filtrate are generated by solid-liquid separation, and an acid is added to the secondary neutralized precipitate to obtain a redissolved liquid and
the redissolved liquid obtained is subjected to solvent extraction as the post-neutralization eluate in the solvent extraction step.

7. The method for recovering scandium according to claim 2, wherein a neutralizing agent is added to the eluate to adjust a pH to a range of 5 to 6, a neutralized precipitate and a neutralized filtrate are generated by solid-liquid separation, and an acid is added to the neutralized precipitate to obtain a redissolved liquid in the neutralization step and
the redissolved liquid obtained is subjected to solvent extraction as the post-neutralization eluate in the solvent extraction step.

8. The method for recovering scandium according to claim 3, wherein a neutralizing agent is added to the eluate to adjust a pH to a range of 5 to 6, a neutralized precipitate and a neutralized filtrate are generated by solid-liquid separation, and an acid is added to the neutralized precipitate to obtain a redissolved liquid in the neutralization step and
the redissolved liquid obtained is subjected to solvent extraction as the post-neutralization eluate in the solvent extraction step.

9. The method for recovering scandium according to claim 4, wherein a neutralizing agent is added to the eluate to adjust a pH to a range of 5 to 6, a neutralized precipitate and a neutralized filtrate are generated by solid-liquid separation, and an acid is added to the neutralized precipitate to obtain a redissolved liquid in the neutralization step and the redissolved liquid obtained is subjected to solvent extraction as the post-neutralization eluate in the solvent extraction step.

10. The method for recovering scandium according to claim 2, wherein in the neutralization step, a neutralizing agent is added to the eluate to adjust a pH to a range of 3.5 to 4.5, a primary neutralized precipitate and a primary neutralized filtrate are generated by solid-liquid separation, subsequently a neutralizing agent is further added to the primary neutralized filtrate to adjust a pH to a range of 5.5 to 6.5, a secondary neutralized precipitate and a secondary neutralized filtrate are generated by solid-liquid separation, and an acid is added to the secondary neutralized precipitate to obtain a redissolved liquid and the redissolved liquid obtained is subjected to solvent extraction as the post-neutralization eluate in the solvent extraction step.

11. The method for recovering scandium according to claim 3, wherein in the neutralization step, a neutralizing agent is added to the eluate to adjust a pH to a range of 3.5 to 4.5, a primary neutralized precipitate and a primary neutralized filtrate are generated by solid-liquid separation, subsequently a neutralizing agent is further added to the primary neutralized filtrate to adjust a pH to a range of 5.5 to 6.5, a secondary neutralized precipitate and a secondary neutralized filtrate are generated by solid-liquid separation, and an acid is added to the secondary neutralized precipitate to obtain a redissolved liquid and the redissolved liquid obtained is subjected to solvent extraction as the post-neutralization eluate in the solvent extraction step.

12. The method for recovering scandium according to claim 4, wherein in the neutralization step, a neutralizing agent is added to the eluate to adjust a pH to a range of 3.5 to 4.5, a primary neutralized precipitate and a primary neutralized filtrate are generated by solid-liquid separation, subsequently a neutralizing agent is further added to the primary neutralized filtrate to adjust a pH to a range of 5.5 to 6.5, a secondary neutralized precipitate and a secondary neutralized filtrate are generated by solid-liquid separation, and an acid is added to the secondary neutralized precipitate to obtain a redissolved liquid and the redissolved liquid obtained is subjected to solvent extraction as the post-neutralization eluate in the solvent extraction step.

* * * * *